United States Patent [19]

Vitolo et al.

[11] 3,824,560

[45] July 16, 1974

[54] NURSE RESPONSE VERIFICATION SYSTEM

[75] Inventors: Richard D. Vitolo, 130 N. Brighton St., Burbank, Calif. 91506; Philip Ingalls, Canoga Park, Calif.

[73] Assignee: said Vitolo, by said Ingalls

[22] Filed: Oct. 2, 1972

[21] Appl. No.: 294,364

[52] U.S. Cl. .............. 340/172.5, 340/313

[51] Int. Cl. .............. G06f 3/00

[58] Field of Search .............. 340/172.5, 311-314, 340/286, 152 R

[56] References Cited

UNITED STATES PATENTS

| | | | |
|---|---|---|---|
| 2,896,021 | 7/1959 | Philipps | 340/312 |
| 3,251,050 | 5/1966 | Given | 340/313 |
| 3,374,464 | 3/1968 | Brothman et al. | 340/172.5 |
| 3,407,387 | 10/1968 | Looschen et al. | 340/172.5 |
| 3,566,365 | 2/1971 | Rawson et al. | 340/172.5 |
| 3,629,855 | 12/1971 | Conley | 340/172.5 |
| 3,631,449 | 12/1971 | Head | 340/313 |
| 3,691,528 | 9/1972 | Calvagna et al. | 340/152 R |
| 3,699,523 | 10/1972 | Percher | 340/172.5 |

*Primary Examiner*—Harvey E. Springborn
*Attorney, Agent, or Firm*—Flam & Flam

[57] ABSTRACT

A nurse response verification system particularly useful in hospitals or other health care facilities automatically records (a) the time that each patient calls for assistance, (b) how long the nurse takes to respond to the call, and (c) the length of time the nurse spends in service to the patient. The system comprises a plurality of remote stations each situated in a hospital room and connected to a controller which repetitively and sequentially interrogates all stations. Each time a nurse call is initiated, the station in the room where service was requested transmits an interrogation response word which causes the controller to establish in memory a record (a "call word") associated with that call. The "wait time" taken to respond to the call is tallied in the call word. When the nurse reaches the room, she presses a switch at the station, indicating that the call has been answered and identifying the bed of the patient requesting service. The station transmits this information to the controller for entry into the call word. The duration of service also is tallied in the call word. Upon completion of service, the nurse again presses a swtich at the room station. This causes the controller to complete the call word, which is stored along with other records for subsequent printout in report form, at operator request.

5 Claims, 9 Drawing Figures

NURSE RESPONSE VERIFICATION SYSTEM

BACKGROUND OF THE INVENTION

1. Field of the Invention

The present invention relates to a system for automatically monitoring requests for service from a plurality of remote stations, including measurement of the time taken by personnel to respond to each request, and the duration of service performed by the personnel. The system is useful for monitoring nursing calls in a health care facility 2. Description of the Prior Art As an aid to hospital administrators and nursing directors, it is an object of the present invention to provide an automated nurse response verification system which provides accurate nursing service accounting. The system automatically monitors the time of each request for nursing service, the amount of time taken to respond, and the duration of nursing care rendered. The information is stored in a memory and is available for printout in accumulative report form.

Use of the inventive verification system results in increased patient care and satisfaction. Patients feel more confident knowing their individual requests for care will be answered promptly and that the time spent with them will be recorded automatically.

Doctors have an immediate record of how much nursing care has been rendered to a given patient at any time. More efficient nursing service results. The printed records provided by the system can be utilized to determine adequate staffing to meet specific patient requirements and to minimize non-nursing duties. For example, records provided by the system may indicate a very heavy demand for patient care in certain nursing units, while verifying that other units have far fewer nursing calls. Statistical information gathered by the system may disclose certain peak times when considerable nursing care is demanded, while indicating other times when little service is requested. Nursing staff scheduling can be optimized to satisfy these time and unit demand fluctuations.

The avilability of complete and accurate nursing service records also aids in minimizing hospital costs. The records provide valuable statistical data, needed by the health industry, with regard to nursing time requirements for various types and classifications of patients.

SUMMARY OF THE INVENTION

The foregoing and other objectives are achieved by providing a nurse response verification system consisting of a plurality of remote stations each installed in a patient's room, and connected to a controller situated at a nursing station or elsewhere in the health care facility. The controller periodically interrogates each room station. When a patient requests nursing care, as by depressing the conventional nurse call button, the associated room station transmits an interrogation response word indicating to the controller that a nurse has been called. The controller establishes a call word in memory associated with that request for service, and starts counting the amount of time taken for a nurse to respond to the call.

When the nurse answers the call, she pushes a button at the room station designating the bed of the patient requesting service. This causes the station to transmit a "service" status signal to the controller, terminating measurement of the "wait time." The controller begins to measure the duration of time spent by the nurse in administering to the patient. When the nurse completes the service, she again presses a switch at the room station, causing the controller to terminate measurement of the "service time," and to store the completed call word.

The system is provided with a report request panel from which a variety of accumulated nursing care reports may be requested. Upon such request, the appropriate information is culled from the controller memory and printed out to provide permanent written verification of the nursing service provided.

BRIEF DESCRIPTION OF THE DRAWINGS

A detailed description of the invention will be made with reference to the accompanying drawings, wherein like numerals designate corresponding parts in the several figures.

DESCRIPTION OF THE PREFERRED EMBODIMENT

The following detailed description is of the best presently contemplated mode of carrying out the invention. This description is not to be taken in a limiting sense, but is made merely for the purpose of illustrating the general principles of the invention since the scope of the invention is best defined by the appended claims.

Figure 1:
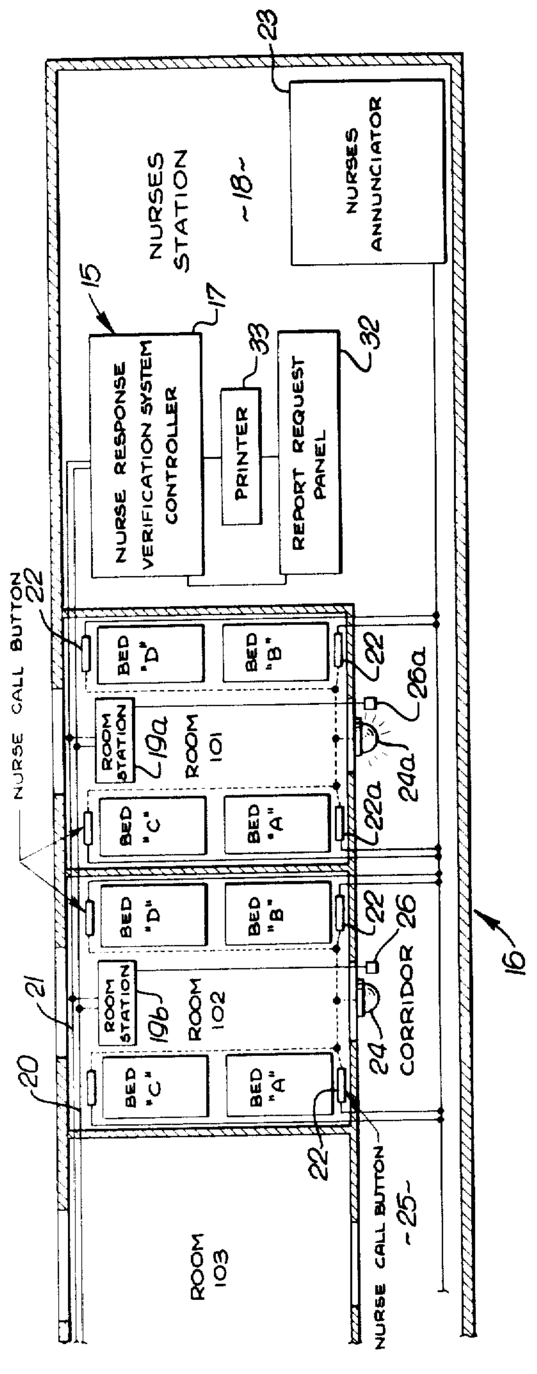
FIG. 1 is a plan view of a health care facility equipped with a nurse response verification system in accordance with the present invention.
Figure 2:
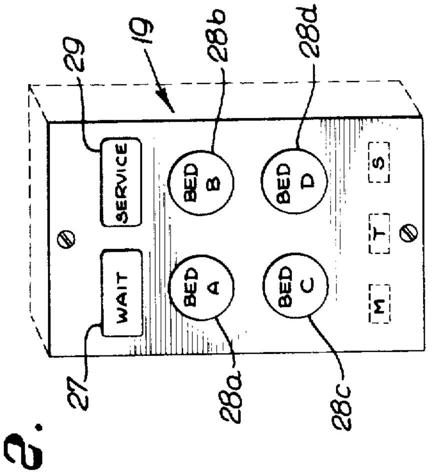
FIG. 2 is a pictorial view of a typical room station useful for signaling that a call has been answered and that service to the patient has been completed.

Referring now to FIG. 1, the nurse response verification system 15 advantageously is installed in a hospital or other health care facility 16. The system 15 includes a controller 17 which may be situated at the hospital nurses station 18. Connected to the controller 17 are a plurality of remote stations 19 (FIG. 2) each situated in a respective hospital room. Thus in FIG. 1 the station 19a is situated in room 101, the station 19b is located in room 102, and other like stations 19 are located in other hospital rooms. Each room station 19 periodically is interrogated by the controller 17 via a common outbound buss 20. In response to such interrogation, each room station 19 transmits a response word back to the controller 17 via an inbound buss 21. The response word may indicate that no service has been requested, that a nurse has been called, or that the nurse is providing service to a patient in the room containing the responding station 19.

In the embodiment illustrated, each station 19 cooperates with the conventional nurse call button system to recognize when a patient has requested service. Thus in FIG. 1, each hospital bed is provided with a nurse call button 22 wired to an annunciator 23 situated at the nurses station 18. As part of this conventional system, a dome light 24 is located in the hospital corridor 25 above the door to each room. Whenever a patient pushes the nurse call button 22, the dome light 24 outside that patient's room goes on. Each station 19 is provided with a photosensor 26 situated adjacent the corresponding dome light 24. Thus for example, when the patient in room 101, bed A, presses the nurse call button 22*a*, the dome light 24*a* goes on and illuminates the photosensor 26*a*. Accordingly, the station 19*a* signals to the controller 17 that a nurse has been summoned to room 101. A "wait" light 27 (FIG. 2) also goes on at the station 19*a*.

When a nurse responds to the call, she goes to the station 19*a* and depresses that one of the switches 28*a* – 28*d* (respectively designated "Bed A" through "Bed D") corresponding to the bed of the patient requesting service. For example, if the switch 28*a* is closed, the station 19*a* will signal to the controller 17 that the patient in bed A of room 101 has requested service, and that a nurse has responded to the call and now is administering to the patient's needs. The "wait time" taken for the nurse to respond automatically is recorded by the controller 17. Closure of the switch 28*a* also causes the wait light 27 to go off and a service light 29 to go on.

When the nurse has completed taking care of the patient, she again depresses the switch 28*a*. This extinguishes the service light 29, and signals to the controller 17 that the service is complete. The controller 17 automatically records the "service time", i.e. the duration of time which the nurse spent with the patient, thereby completing a call word or record of the call stored in the controller 17 memory.

A report request panel 32 (FIGS. 1 and 3) cooperates with the controller 17 to initiate production on a printer 33 of selected nursing call reports. For example, the nursing supervisor may request printout of all calls made by a specific patient during some time period. To this end, the supervisor dials in the patient's room number and bed identification (e.g., room 101, bed A) on a set of rotary switches 34, and pushes the "call report" switch 35. The printer 33 then prints out a call report, such as that shown in the following Example I.

EXAMPLE I

CALL REPORT, BED 101A

| BED ID | CALL | ANSWER | SERVICE | DATE |
|---|---|---|---|---|
| 101A | 10:04 AM | 1 MIN:30 SEC | :23 MIN | 3:15:72 |
| 101A | 11:25 AM | 1 MIN:58 SEC | 1HR: 10 MIN | 3:15:72 |
| 101A | 12:48 AM | 2 MIN: 1 SEC | :25 MIN | 3:15:72 |
| 101A | 2:32 PM | 1 MIN:46 SEC | :15 MIN | 3:15:72 |
| 101A | 4:24 PM | 1 MIN:52 SEC | 1HR: 21 MIN | 3:15:72 |

The panel 32 also may be used to request a "summary report" giving an accumulative record of total nursing care for each bed. Example II below is a typical summary report printed out by the printer 33 when the request panel switch 36 is depressed.

EXAMPLE II

SUMMARY REPORT

| BED ID | CALLS | TOTAL SERVICE | TIME PERIOD | DATE |
|---|---|---|---|---|
| 100A | 6 | 2HR:25 MIN | 7:00AM/4:30PM | 3:15:72 |
| 100B | 7 | 3HR:26 MIN | 7:00AM/4:30PM | 3:15:72 |
| 100C | 4 | 1HR:15 MIN | 7:00AM/4:30PM | 3:15:72 |
| 101A | 5 | 3HR:34 MIN | 7:00AM/4:30PM | 3:15:72 |
| 101B | 9 | 4HR:10 MIN | 7:00AM/4:30PM | 3:15:72 |

The request panel 32 (FIG. 3) also includes an on-off switch 37 controlling power to the entire system 15, and a "clear" switch 38 used to empty the memory of the controller 17. When the "clear" switch 38 is depressed, the entire contents of the controller 17 memory is written out by the printer 33. However, words relating to calls in progress are reentered in the memory, so that such records are not lost.

Figure 4:
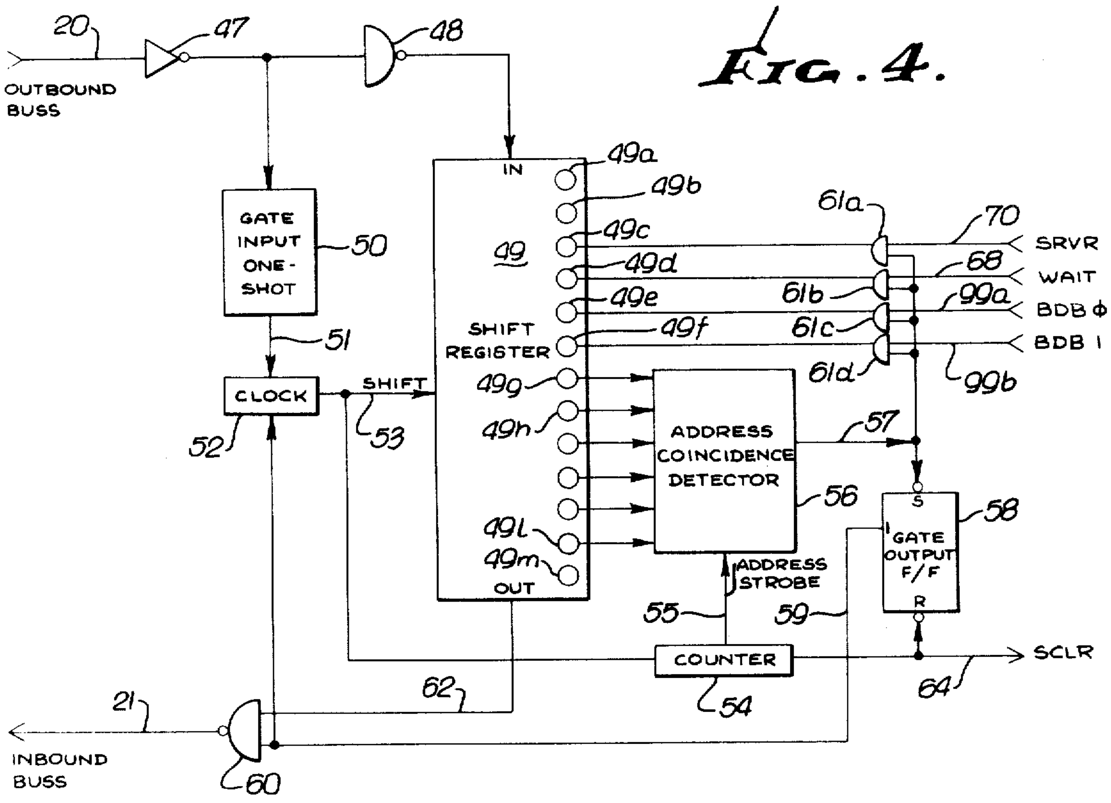
FIGS. 4 and 5 together comprise an electrical schematic diagram of illustrative circuitry for the room station of FIG. 2.
Figure 5:
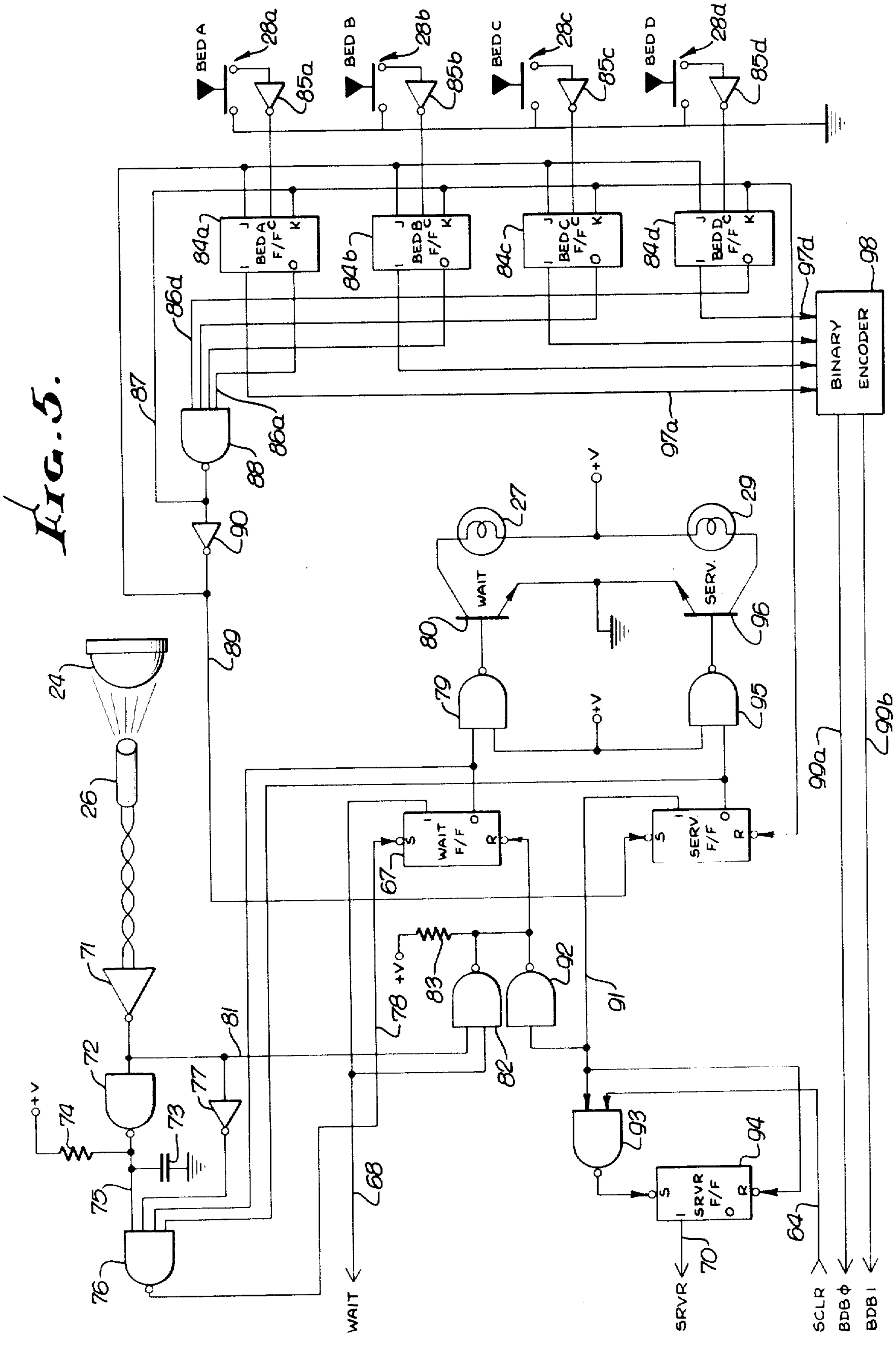

As described below in conjunction with FIG. 7, the controller 17 transmits along the outbound buss 20 a series of serial, binary coded interrogate words each containing an address associated with one of the stations 19. The interrogate words are received by all of the stations 19, but only that one station having the address specified by the interrogate word transmits a response word back to the controller 17. Circuitry to accomplish such address recognition and response word transmission is illustrated in FIGS. 4 and 5, with related waveforms being shown in FIG. 6.

Figure 6:
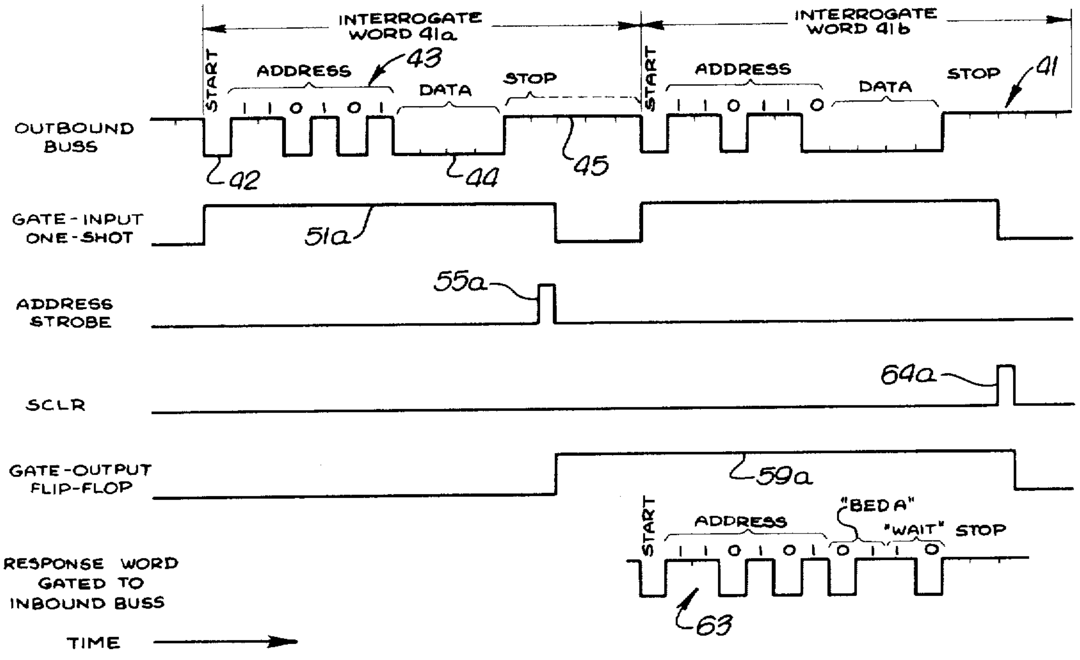
FIG. 6 shows typical waveforms associated with operation of the station circuitry of FIGS. 4 and 5.

Referring to FIG. 6, the waveform 41 illustrates two consecutive interrogate words 41*a*, 41*b* transmitted via the output buss 20. Each interrogate word begins with a start bit 42 (always a binary 0 followed by a six-bit address code 43 identifying the specific station 19 which is being interrogated. This is followed a data field 44 consisting of four binary 0 bits. Station status and bed identification data is inserted into this field 44 by the responding station 19. Finally, there is a stop field 45 consisting of several binary 1 bits. Note that the interrogate word 41*b* is identical to the preceeding word 41*a*, except that the address codes of the two words are different.

At each station 19 (FIG. 4), the incoming interrogate words are supplied via an inverter 47 and a NAND gate 48 to a shift register 49. As soon as the start bit 42 is received, the output of the inverter 47 goes high to trigger a gate input one-shot 50 (a monostable multivibrator). The output of the one-shot 50, on a line 51, is high for a period of time encompassing reception of the address and data fields 43, 44 of the incoming interrogate word 41. This output (see waveform 51*a*, FIG. 6) gates on a clock 52 which supplies shift pulses via a line 53 to the register 49. As a result, the incoming interrogate word is shifted into the register 49. A counter 54 counts the shift pulses on the line 53 and provides on a line 55 an address strobe pulse 55*a* (FIG. 6) at the time when the interrogate word address field 43 is present in the shift register locations 49*g* through 49*z*. Thus the address strobe pulse 55*a* occurs when the entire interrogate word 41 has been shifted into the register 49.

The interrogate word address is compared with the address of this station 19 by a coincidence detector 46 (FIG. 4) enabled by the strobe pulse 55*a*. If there is coincidence, meaning that this station 19 is being interrogated, the coincidence detector 56 will produce an output pulse on a line 57 causing a "gate output" flip-flop 58 to be set. The resultant 1 output of the flip-flop 58 (waveform 59*a*, FIG. 6) on the line 59 enables a NAND gate 60 to permit transmission of a response word to the controller 17 via the inbound buss 21.

When address coincidence is detected, the signal on the line 57 also enables four AND gates 61*a* – 61*d* which gate "wait" and "service" status signals (designated WAIT and SRVR respectively) and bed identification bits (designated BDB0 and BDB1) into the data field 44 (FIG. 6) in positions 49*c* – 49*f* of the shift register 49.

The gate output signal 59*a* on the line 59 continues to enable the clock 52, so that additional shift pulses are produced on the line 53. As a result, the word in the register 49, including the present station address and the contents of the data field 44, is shifted out via the line 62 and the enabled gate 60 to the inbound buss 21. This data stream constitutes the response word 63 (FIG. 6) transmitted back to the controller 17. Transmission is terminated when the counter 54 supplies an SCLR pulse 64*a* (FIG. 6) on a line 64 to reset the gate output flip-flop 58.

If this station 19 (FIG. 4) is not being interrogated, the address coincidence detector 56 will produce no output when enabled by the strobe pulse 55 *a*, and the output gate flip-flop 58 will not be set. The gate 60 will remain disabled, preventing transmission of a response word. Simultaneously, however, that other station 19 which is being interrogated will transmit a response word onto the inbound buss 21.

Circuitry provideing response status and bed identification data is shown in FIG. 5. Referring thereto, when a dome light 24 goes on to indicate that a nurse has been called, the associated photocell 26 provides an output which is used to set a "wait" flip-flop 67. When so set, the 1 output of the flip-flop 67 supplies the WAIT signal on a line 68. The "wait" flip-flop 67 is reset, and a "service" flip-flop 69 is set when any of the bed switches 28*a* – 28*d* is closed. Resetting of the flip-flop 67 terminates the WAIT signal, while setting of the service flip-flop 69 initiates the service (SRVR) signal on a line 70. When one of the switches 28*a* – 28*d* again is closed, indicating that the nurse has completed service to the patient, the flip-flop 69 is reset, causing the SRVR signal to be terminated.

The "wait" flip-flop 67 is not set immediately after the dome light 24 goes on. Rather, a time delay is introduced to prevent proudction of the WAIT signal when the dome light 24 flashes on and off, as in an emergency condition. To this end, the photosensor 26 is connected via an inverter 71 and a NAND gate 72 to a relatively large (typically 5 mfd) capacitor 73. The capacitor 73 is charged via a resistor 74 when the photosensor 26 provides an output; at the end of the charging period, a high signal occurs at one input 75 of a four-input NAND gate 76. The NAND gate 76 also receives as inputs the 0 outputs of the wait and service flip-flops 67 and 69, and a signal, supplied via the inverter 71 and another inverter 77, which is high only when the photosensor 26 is illuminated by the dome light 24. The NAND gate 76 output is connected via a line 78 to the set (S) terminal of the "wait" flip-flop 67. Accordingly, the four inputs to the NAND gate 76 all will be high, and the flip-flop 67 will be set, only when (a) a delay time established by the capacitor 73 has passed since the dome light 24 went on, (b) the dome light 24 is still on, and (c) neither of the "wait" nor the service flip-flops 67, 69 is set, i.e., the station 19 is not already in a wait or service condition.

When the flip-flop 67 is set as just described, the WAIT signal on the line 68 goes high, and the wait light 27 goes on. To accomplish such lamp turn-on, the 0 output of the flip-flop 67 is inverted by a NAND gate 79, thereby providing an output which turns on a transistor 80 to supply current to the lamp 27.

The patient may terminate the nurse call before a nurse responds. This occurs when the patient resets the call button 22 associated with the nurse annunciator system, thereby extinguishing the dome light 24. In such instance, the output line 81 from the inverter 71 (FIG. 5) will go high at the same time that the 1 output of the wait flip-flop 67 is high. This will cause the output of a NAND gate 82 to go low, thereby producing a negative-going signal at the reset (R) terminal of the flip-flop 67. This terminal previously was held high by a voltage supplied via a resistor 83. The negative-going signal will reset the "wait" flip-flop 67 to the 0 state, terminating the WAIT signal on the line 68.

Normally the WAIT signal will remain on until the nurse closes one of the switches 28*a* – 28*d*, thereby setting one of four "bed" flip-flops 84*a* – 84*d* in response to a toggle input provided via the corresponding one of four inverters 85*a* – 85*d*. This causes the "service" flip-flop 69 to be set, and the "wait" flip-flop 67 to be reset in the following manner.

When a "bed" switch 28*a* – 28*d* is depressed, one of the four 0-output lines 86*a* – 86*d* from the flip-flops 84*a* – 84*d* will go low, producing a high output on a line 87 from a NAND gate 88, and producing a negative-going output on a line 89 from an inverter 90. This signal on the line 89 causes the "service" flip-flop 69 to be set to the 1 state. The resultant high output on a line 91 is inverted by a NAND gate 92 to reset the flip-flop 67, thereby terminating the WAIT signal.

The signal on the line 91 is inverted by a NAND gate 93 (enabled by the SCLR pulse 64*a* on the line 64) to provide a negative going transient which sets an "SRVR" flip-flop 94 to the 1 state. The resultant output on the line 70 constitutes the SRVR signal which is used to set the "service" status bit in the response word transmitted back to the controller 17. Use of the SCLR pulse to enable the NAND gate 93 insures that a wait status signal will be transmitted back to the controller 17 in the instance when a nurse depresses one bed button to terminate the service period to one patient, and quickly thereafter depresses another bed button to begin the service period for another patient in the same room.

At the beginning of the service period, the "wait" lamp 27 goes off and the "service" lamp 29 goes on. This is achieved using a NAND gate 95 and a transistor 96 which cooperate to supply current to the lamp 29 when the "service" flip-flop 69 is set. Resetting of the "wait" flip-flop 67 causes the NAND gate 79 and transistor 80 to turn off current to the "wait" lamp 27.

The service period ends when the nurse again closes one of the switches 28*a* – 28*d* (FIG. 5). This causes the corresponding flip-flop 84*a* – 84*d* to be reset, so that the output of the NAND gate 88 again goes low. The resultant negative going signal on the line 87 resets the "service" flip-flop 69, causing the signal on the line 91 to go negative. This in turn resets the SRVR flip-flop 94, terminating the "service" SRVR signal on the line 70. Thereafter the next response word transmitted to the controller 17 indicates "complete" status.

The bed of the patient requesting service is identified by which switch 28*a* – 28*d* is closed. The one flip-flop 84*a* – 84*d* set by such switch closure provides a high output on one of the four lines 97*a* – 97*d* directed to a binary encoder 98. The encoder 98 translates the one-of-four code on the lines 97*a* – 97*d* to a 2-bit binary code on the lines 99*a* and 99*b*. These bits, designated BDB0 and BDB1, are supplied to the data field of the response word in the shift register 49 to designate which bed has requested service.

Figure 7:
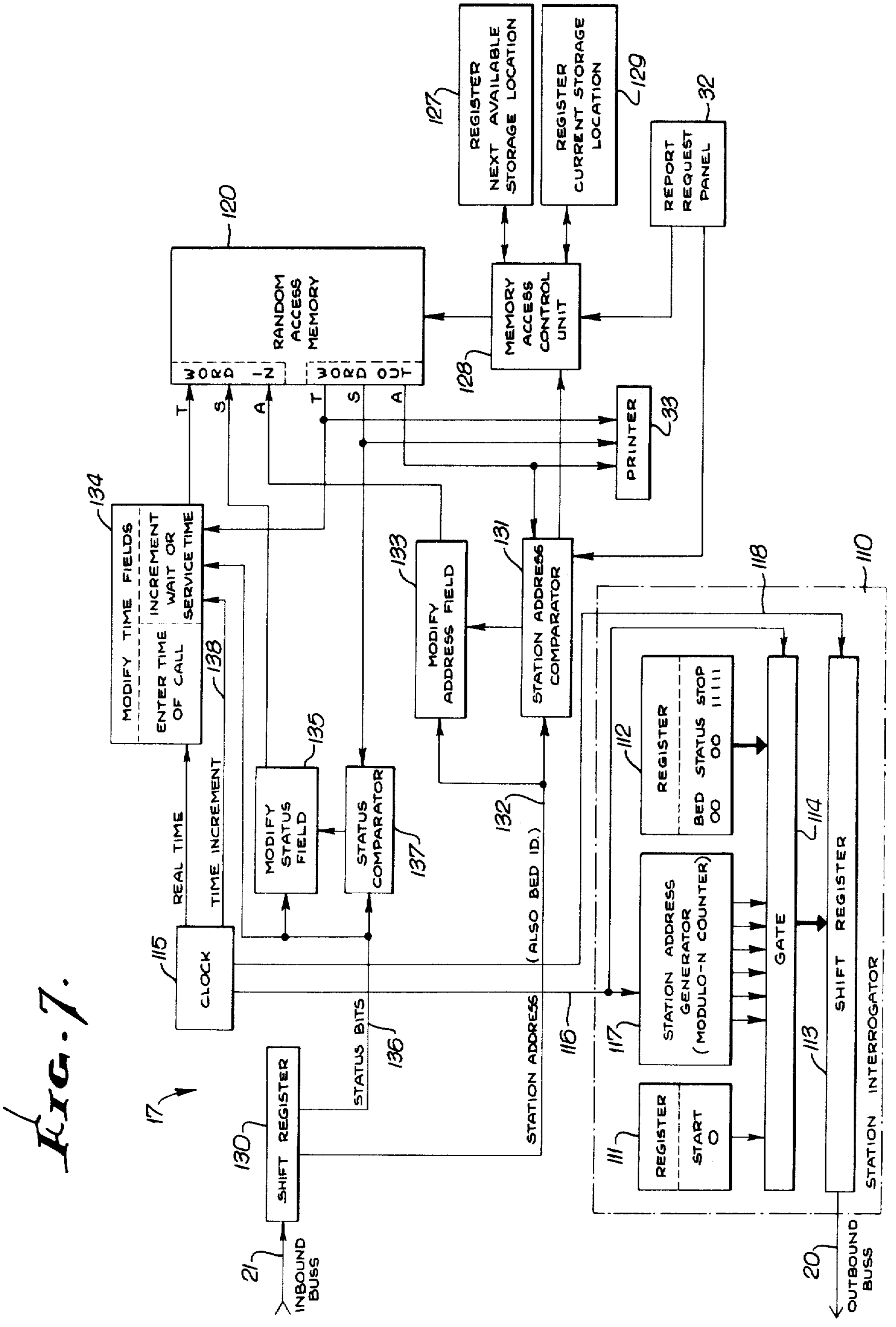
FIG. 7 is an electrical block diagram of a typical embodiment of the verification system controller.

In the illustrative embodiment of FIG. 7, the controller 17 includes a station interrogator 110 which generates the interrogate words 41 (FIG. 6) transmitted via the outbound buss 20. The start, data and stop fields 42, 44, 45 of each interrogate word are generated by maintaining the fixed bit format of these fields in a pair of registers 111, 112. Just prior to the transmission of each word, this fixed data is transferred from the registers 111, 112 to a shift register 113 via a gate 114. A gate enable signal is supplied from a clock 115 via a line 116. The station address code for each interrogate word is generated by a modulo-N counter 117 which is incremented by the timing signals on the line 116. The contents of the address generator 117 are transferred via the gate 114 into the shift register 113 locations corresponding to the interrogate word address field 43. The complete interrogate word thus gated into the register 113 is shifted out to the outbound buss 20 serially in response to shift pulses provided via the line 118 from the clock 115.

In the embodiment of FIG. 7, the station interrogator 110 produces words 41 which successively interrogate N stations 19. Advantageously, each of the N stations 19 is interrogated once per second by providing address increment pulses on the line 116 at a rate of 1/N per second, and by shifting each interrogate word out of the register 20 at a rate of (1/N·n) bits per second, where *n* is the number of bits in each interrogate word and N is the number of stations in the system. In such instance, the shift pulses provided on the line 118 occur at the rate of (1/N·n per second.

Figure 8:
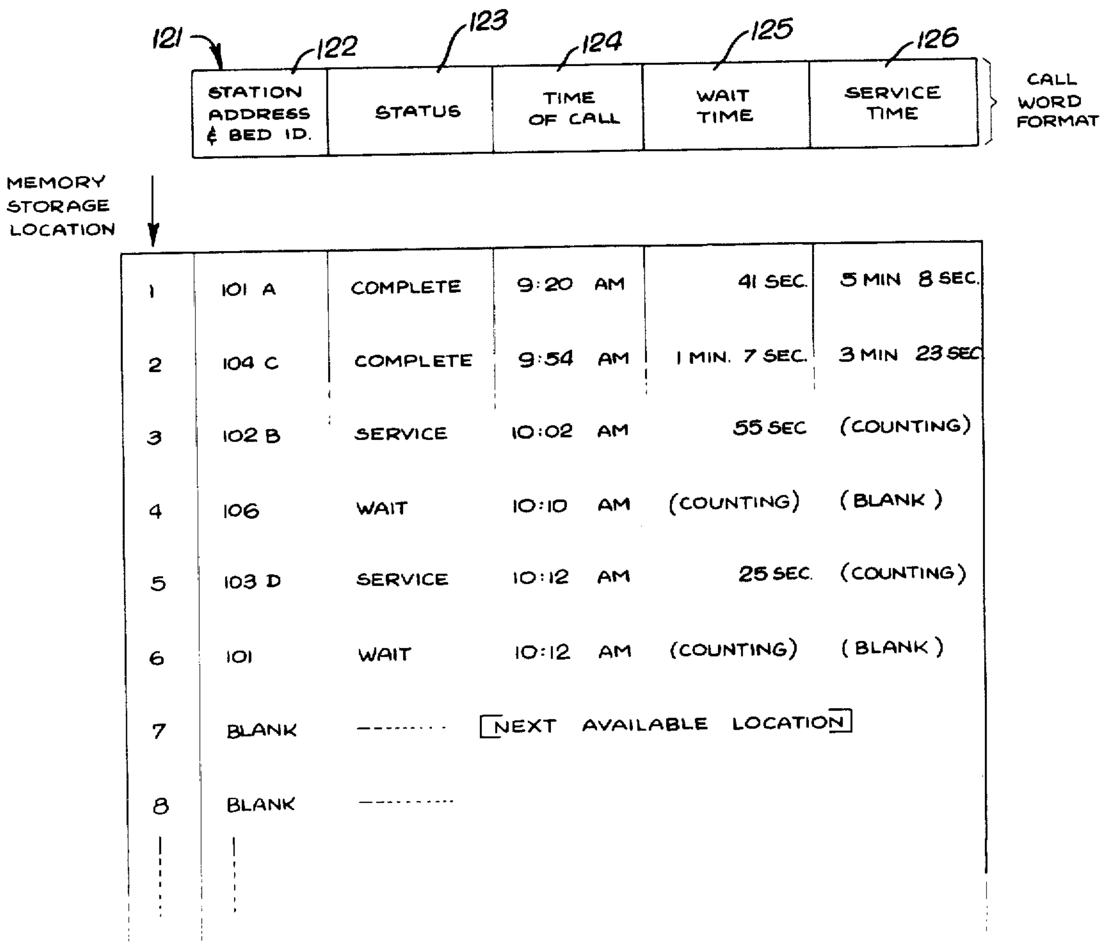
FIG. 8 illustrates diagrammatically the call word format and typical contents of the memory employed in the controller of FIG. 7.

The contorller 17 maintains a record of all nurse request calls in a random access memory 120 (FIG. 7). The contents of the memory 120 advantageously are arranged as shown in FIG. 8. A "call word" having the format 121 (FIG. 8) is established by the controller 17 each time a request for service is initiated at any station 19. The call word includes a station address and bed identification field 122, a status field 123, a "time of call" field 124, a "wait time" field 125 and a "service time" field 126.

As each call word 121 is generated in response to a new service request from some station 19, the word is placed in the next available, higher order memory storage location of the memory 120. This next available location is identified by the contents of a register 127 (FIG. 7) associated with the memory access control unit 128. Thus in the example of FIG. 8, storage locations 1 – 6 of the memory 120 contain call words associated with completed or current requests for service. All higher order memory storage locations are empty. The next available storage location (location 7) is specified by the contents of the register 127.

Each response word 63 (FIG. 6) received by the controller 17 via the inbound buss 21 is entered in a shift register 130 (FIG. 7). The memory 120 then is searched. If the memory 120 contains a call word associated with a current reuest for service from that station, the word is read out, and the memory storage location of the word is entered into a register 129. The read out word then is modified as required, and replaced into the memory 120 at the same location. If the incoming response word indicates that a nursing call has just been initiated, a new call word is established.

To accomplish such memory searching and word modification, as each response word is received at the register 130, the memory control unit 128 accesses successive call words from the memory 120 beginning at the location identified by the register 127, and proceeding backward (i.e., in decreasing order) through successive storage locations. The contents of the address field 122 of each call word is compared by an address comparator 131 with the station address of the response word in the register 130, which address is present on a line 132. When coincidence is detected, searching terminates; and the accessed call word associated with the responding station then is available for modification as required, in accordance with the contents of the response word data field 44.

If no call word associated with the responding station is found in the memory 120, and if the response word indicates that a nurse call has been initiated, a new call word is established in the memory 120 at the next available storage location. The address of the station requesting service, present on the line 132, is entered into the address field 122 of the new call word by means of appropriate address field modification circuitry 133. The time of call is entered into the field 124 of the new word by means of appropriate time field modification circuitry 134 which receives a real time output from the clock 115. The "wait" status is entered into the status field 123 by means of appropriate circuitry 135, and the new word is placed in the memory 120 at the storage location specified by the register 127. The register 127 then is incremented to identify the next available storage location.

If a call word associated with the responding station was accessed from the memory 120, the call word contents are modified as necessary. Thus, the contents of the call word status field 123 are compared with the status bits from the data field 44 of the response word in the register 130. These status bits are supplied via a line 136 to a status comparator 137. If the station status is unchanged since the last interrogation, no modification of the call word status field 123 is required. However, the appropriate "wait time" or "service time" field 125 or 126 is incremented by the time field modification circuitry 134. In this manner, the call word fields 125 and 126 function as accumulators to talley the "wait" and "service" times.

If a "wait" status is indicated, the "wait time" field 125 is advanced by a time increment advantageously provided by the clock 115 via a line 138. This time increment equals the amount of time taken by the controller 17 to interrogate all stations 19. Thus, where N stations are interrogated in a period of one second, the time increment is one second. This time increment is added to the "wait time" field 117, so that the current contents of that field indicates the elapsed time taken to respond to a call. In FIG. 8, storage location 4 contains a call word in the "wait" status. If the responding station is in the "service" status, the circuitry 134 increments the call word "service time" field 126 by a like time increment.

If the status of the station providing the response word currently in the register 130 has changed since the last interrogation of that station, the comparator 137 will indicate a difference between the call word status field 123 and the status indicated on the line 136. In this instance, the circuitry 135 appropriately will modify the call word status field 123 from "wait" to "service" or from "service" to "complete". The corresponding "wait time" field 125 or "service time" field 126 is incremented a final time, so that the contents of the incremented field will specify the total time taken to respond to the nurse call, or the total time spent in service to the patient.

When the change from "wait" to "service" status is detected, an identification of the bed requesting service also is entered into the call word. This is accomplished by means of the address field modification circuitry 133 which receives the bed ID from the response word via the line 132.

After modification, each call word is returned to the memory 120 where it is maintained for subsequent modification, and for printout when a report is requested. The typical memory 120 contents shown in FIG. 8 includes call words associated with complete nursing service requests together with calls current in "wait" and "service" status.

Figure 3:
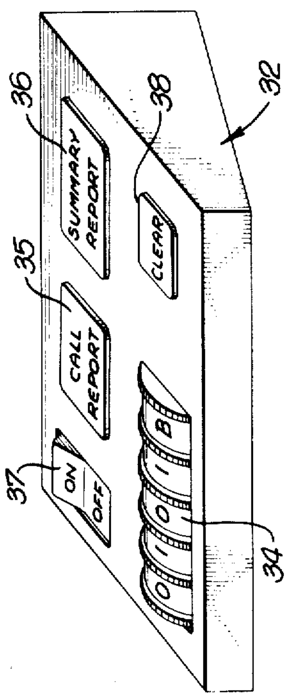
FIG. 3 is a pictorial view of a report request panel used to initiate printout of nursing service reports from the inventive system.

A call report is requested by depressing the call report switch 35 on the request panel 32 (FIG. 3). This causes the control unit 128 (FIG. 7) to access call words from the memory 120, beginning at the lowest storage location and progressing forwardly through successive locations. The station address and bed identification of each culled word is compared by the comparator 131 with the address set on the request panel selection switches 34 (FIG. 3). If there is coincidence, indicating that the accessed call word relates to a nursing request made by the designated patient, the word is printed out by the printer 33. This operation is repeated until the entire contents of the memory 120 have been scanned. The result is a call report such as that shown in Example I above.

Other reports such as the summary report of Example II also may be prepared using the controller 17. To produce a summary report, all of the call words associated with a particular bed are culled from the memory 120. The contents of the "service time" fields 126 of these words are summed by an adding circuit (not shown) and printed out, together with the bed identification and a talley of the number of such call words, corresponding to how many requests for nursing service were made by the identified patient. Note that the sum of the "service times" represents the total amount of nursing assistance provided to the designated patient. The process is repeated for each bed, thereby obtaining a summary report such as that shown in Example II above.

Figure 9:
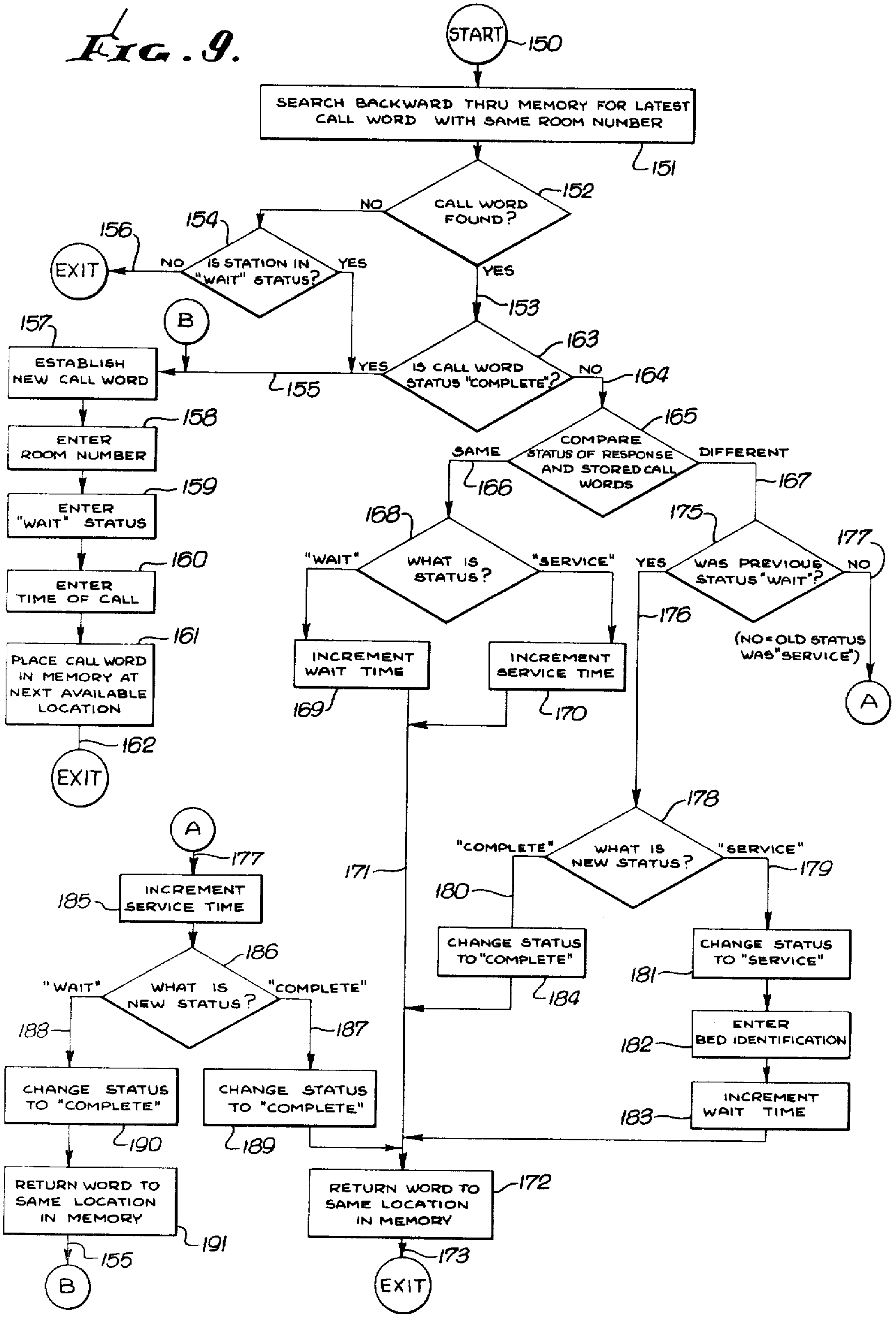
FIG. 9 is a flow chart summarizing operation of the controller of FIG. 7.

The flow chart of FIG. 9 illustrates the operational sequence repeated by the controller 17 each time a complete response word is received at the register 130. The sequence is initiated (block 150) with a backward search (block 151) to retrieve from the memory 120 the latest call word having the same station address as that specified by the response word. If a call word is found (block 152) the operation proceeds via the path 153 to the block 163. If no word is found, indicating that no previous request for service has been recorded, the response word status bits are scanned (block 154) to determine if a nurse call has been initiated. If so, the bits will indicate a "wait" status and the path 155 will be followed to the block 157; if not, the program is exited via the path 156.

Blocks 157 through 161 — A new call word is established each time a new request for service is received. The station address, present on the line 132 (FIG. 7) from the register 130, is entered by the circuitry 133 into the address field 121 of the new call word. The "wait" status is entered in the field 123 by the circuitry 135. The time of call is entered in the field 124 by the circuitry 134. The new call word is placed in the memory 120 at the next available storage location specified by the register 127, the contents of which register then is incremented. The program is exited via the path 162.

Block 163 — The call word culled from the memory 120 (block 151), although associated with the station currently being interrogated, may relate to a previously completed nursing service call. If so, the call word status will be "complete," and a new call word must be established. In this instance, the block 163 is exited via the path 155 to the block 157. If the culled word relates to a service request still in process, the path 164 is followed to the block 165.

Block 165 — The status bits of the response word in the register 130 are compared with the status field 123 of the culled word from the memory 120. If the status is unchanged, the path 166 is taken to the block 168; if a change in station status has occurred since the last interrogation, the path 167 is taken to the block 175.

Blocks 168 through 170 — If the station remains in either a "wait" or "service" status, the corresponding "wait time" or "service time" field 125 or 126 of the call word is incremented by the circuitry 134. The program continues via the path 171 to the block 172.

Block 172 — The modified call word then is returned to the same memory storage location, as specified by the contents of the register 129. The program is exited via the path 173.

Block 175 — If the station status has changed since the previous interrogation, the contents of the call word status field 115 is checked to determine if the previous status was "wait." If so, the path 176 is taken to the block 178. If the previous status was "service," the path 177 is taken to the block 185. Block 178 — If the station status has gone from "wait" to "service," the path 179 is taken to the block 181; if the new status is "complete," the path 180 is taken to the block 184.

Blocks 181 through 183 — The change from "wait" to "service" results in corresponding modification of the call word status field 115. The bed identification, now present in the response word, is entered by the circuitry 133 into the call word address field 122. The call word "wait time" field 123 is incremented a final time, to indicate the total time taken in response to the call for service. The modified call word is returned (block 172) to the same memory storage location.

Block 184 — If the patient's call for service is terminated before the nurse responds, the station status will go from "wait" to "complete." In this instance, the call word status field 115 is changed to "complete" and the word is returned to the same memory location. Alternatively, the call word may be deleted from the memory 112.

Blocks 185 and 186 — The "service time" field 118 is incremented a final time to indicate the total time of service provided to the patient. The new station status is determined. If the new status is "complete," the path 187 is followed to the block 189. If the status went from "service" to "wait," indicating that the nurse has completed service to one patient in the room, but that another patient in the same room needs assistance, the path 188 is taken to the block 190.

Block 189 — Upon completion of service, the status field 123 is changed to "complete" and the call word is returned (block 172) to the same location in the memory 120.

Blocks 190 and 191 — The call word status field is modified to "complete" and the word is returned to the same location in memory. The program then branches back via the path 155 to the block 157, to establish a new call word for the service request made by the other patient in the same room.

The operational sequence illustrated in FIG. 9 may be carried out by the controller 17 utilizing hard-wired logic circuitry. Alternatively, the controller 17 may include a stored program specifying the steps of FIG. 9 together with circuitry to execute the stored program. As yet another alternative, the controller 17 itself may consist of a general purpose digital computer programmed with appropriate instructions to carry out the operations of FIG. 9.

Numerous variations may be made to the illustrated system. For example, the station 19 may include additional switches, actuated by the person responding to a call, to signal the type of service provided to the patient. Thus, the nurse may depress the switch (FIG. 2) marked "M" if medication is provided, or may select the switch "T" or "S" to indicate treatment or other service respectively. Appropriate circuitry, similar to the flip-flops 84*a* – 84*d* and the encoder 98, may be utilized to introduce bits into the response word data field designating the type of service. Other switches (not shown) may be provided to indicate the type of personnel (e.g., registered nurse, licensed vocational nurse, orderly, etc.) responding to the call. This information, signaled back to the controller, may be entered in the associated call word to provide the basis for more detailed statistical analyses of nursing service requirements.

Other variations include the use of a separate switch at the station 19 to be depressed by the nurse upon response to the call, or upon completion of service. That is, the switches 28*a* – 28*d* may be used only for bed identification, or may be dispensed with entirely, in favor of a separate switch or switches actuated at the end of the wait and service periods. Instead of a photocell to sense an illuminated dome light, the initiation of a nursing call may be indicated via direct connection between the station 19 and the nurse call button system. Alternatively, the nurse call button system may be dispensed with entirely, and the inventive system also used for the purpose of initially summoning the nurse.

Instead of interrogating all stations via a common buss, each station may be separately connected to the controller, with internal scanning in the controller used to determine when changes in status have occurred at each station. Different interrogation and response word formats and coding of course may be used.

Although particularly useful in a health care facility for recording nursing calls, the present system is by no means so limited. Thus the system can be used in any application where it is desirable to maintain a record of when certain personnel have reached or are present at a particular station location, and/or when such personnel have completed some operation at that location. In this regard, although the term "nurse" is used throughout the description and claims, it is to be understood that this term encompasses not only nurses and other health care personnel, but also personnel of any other sort and occupation. Intending to claim all novel, useful and unobvious features shown or described, the inventors make the following:

We claim:

1. A multistation personnel verification and elapsed time recording system, including:
   - a plurality of remote stations, each remote station including;
   - means for transmitting a request-for-service signal,
   - a service switch means to be actuated when a call for service is answered and when service has been completed, and
   - circuitry for providing to a controller, in response to actuation of said service switch means, "service answered" and "service completed" status-indicating signals,
   - a controller, including;
   - storage means,
   - means for receiving said request for service signal and said status-indicating signals from each of said remote stations,
   - means for establishing a record upon receipt from any remote station of a request-for-service signal, said record containing the identification of the station transmitting said request-for-service signal, a "wait time" portion for recording the elapsed time between when a call is requested and answered, and a "service time" portion for recording the elapsed time between when a call is answered and completed,
   - a time block, and means, cooperating with said time clock, for updating portions of said record each time that remote station provides one of said status-indicating signals said updating means entering into said "wait time" portion the elapsed time between receipt of said request-for-service signal and subsequent receipt of said "service answered" status-indicating signal, said updating means entering into said "service time" portion the elapsed time between receipt of said "service answered" signal and subsequent receipt of said "service completed" status-indicating signal.

2. A system according to claim 1 wherein said controller includes:

means for periodically sequentially interrogating each of said stations, and wherein the "wait time" and "service time" portions of record initially are zero, and wherein the means for updating the record includes;

first means for incrementing the contents of said "wait time" portion each time the station associated with that record is interrogated, the amount of time by which said contents is incremented equaling the amount of time between successive interrogations of the same station, said first means for incrementing being initially responsive to said request for service signal, the incrementing by said first means being terminated in response to receipt of said "service answered" status indicating signal; and second means for incrementing the contents of said "service time" portion each time said associated station is interrogated, the amount of time by which said contents is incremented equaling the amount of time between successive interrogations of the same station, said second means for incrementing being initially responsive to receipt of the "service answered" status indicating signal the incrementing by said second being terminated in response to receipt of said "service completed" status indicating signal.

3. A system according to claim 2 wherein:

said means for interrogating includes;

means at said controller for transmitting to each station sequential interrogate words, each word containing the identification address of an interrogated station, and means at each station for receiving all of said sequential interrogate words and for transmitting back to said controller a response word only in response to coincidence between the identification address in the interrogate word currently received and the identification address of that station, said response word containing the identification address of that station and a status indicating signal.

4. A system according to claim 1 further including call report means for providing a list of all requests for service originating from a particular station, comprising;

selection switch means for specifying said particular station, a printer, and access means for accessing from said storage means all of the records containing the identification of the particular station specified by said selection switch means, and for causing said accessed records to be printed by said printer to provide said list.

5. A system according to claim 1 further including summary report means giving an accumulative record of total service for each station comprising;

first means for accessing from said storage means each of the records containing the identification of a particular station, second means for summing the contents of the "service time" fields of all of the accessed records associated with said particular station to obtain a total service time, and read-out means for providing a visual indication of the identification of said particular station and of the total service time for that particular station.

* * * * *